US006621689B1

(12) United States Patent
Flegel

(10) Patent No.: US 6,621,689 B1
(45) Date of Patent: Sep. 16, 2003

(54) INTERLOCK ARRANGEMENT FOR AN ELECTRICAL PANEL HAVING PARALLEL CENTER-MOUNTED AND AUXILIARY MAIN BREAKERS

(76) Inventor: Michael O. Flegel, 40 E. Four Mile Rd., Racine, WI (US) 53402

( * ) Notice: Subject to any disclaimer, the term of this patent is extended or adjusted under 35 U.S.C. 154(b) by 0 days.

(21) Appl. No.: 10/136,241

(22) Filed: May 1, 2002

(51) Int. Cl.$^{7}$ .................................................. H02B 1/04

(52) U.S. Cl. ....................... 361/631; 361/615; 361/673; 361/627; 200/50.32; 200/50.33

(58) Field of Search ................................ 361/615, 628, 361/631, 632, 656, 693; 200/50.32, 50.33, 5 B, 5 C; 335/160

(56) References Cited

U.S. PATENT DOCUMENTS

| | | | | |
|---|---|---|---|---|
| 2,647,964 A | | 8/1953 | Merkel | |
| 2,929,002 A | | 3/1960 | Wurgler | |
| 3,432,628 A | | 3/1969 | Puetz | |
| 3,492,448 A | * | 1/1970 | Phillips, Jr. | 200/50.33 |
| 3,510,612 A | * | 5/1970 | Ward | 200/50.33 |
| 3,647,997 A | * | 3/1972 | Nerem | 200/50.33 |
| 3,674,948 A | * | 7/1972 | Betlejewski et al. | 200/50.33 |
| 3,801,758 A | | 4/1974 | Shand et al. | |
| 4,270,031 A | * | 5/1981 | Borona et al. | 200/50.33 |
| 4,510,357 A | * | 4/1985 | Winterbottom | 200/50.33 |
| 4,902,859 A | | 2/1990 | Witzmann et al. | |
| 4,924,041 A | | 5/1990 | Yee | |
| 5,008,499 A | | 4/1991 | Yee et al. | |
| 5,393,942 A | | 2/1995 | Reiner et al. | |
| 5,397,868 A | | 3/1995 | Smith et al. | |
| 5,436,415 A | | 7/1995 | Smith et al. | |
| 5,648,646 A | | 7/1997 | Flegel | |
| 5,790,369 A | * | 8/1998 | Sitler | 361/643 |
| 5,814,777 A | | 9/1998 | Green et al. | |
| 5,902,974 A | * | 5/1999 | Fogle et al. | 200/50.33 |
| 5,977,492 A | | 11/1999 | Taylor et al. | |
| 6,031,193 A | | 2/2000 | Flegel | |
| 6,043,439 A | | 3/2000 | Crooks et al. | |
| 6,096,986 A | | 8/2000 | Flegel | |
| 6,180,897 B1 | * | 1/2001 | Montague et al. | 200/50.35 |
| 6,184,595 B1 | | 2/2001 | Flegel | |

* cited by examiner

*Primary Examiner*—Boris Chervinsky
(74) *Attorney, Agent, or Firm*—Boyle, Fredrickson, Newholm, Stein & Gratz, S.C.

(57) ABSTRACT

An interlock assembly for an electrical panel which includes a primary switch arrangement interconnected with a primary power source, and an auxiliary switch arrangement interconnected with an auxiliary power source for supplying power to the electrical panel in the event of an interruption in the primary power source. The interlock assembly includes an interlock member that is movable between first and second interlock positions, for preventing the primary and auxiliary switch arrangements from simultaneously being in the ON position, to ensure that power from only a single power source is supplied to electrical panel at any one time. The interlock assembly includes a movable interlock member interconnected with a support arrangement mounted to the electrical panel within a space defined between the primary and auxiliary switch arrangements. The support arrangement is configured so as to enable the primary switch arrangement to be removed from the electrical panel if desired, and is configured to maintain the auxiliary switch arrangement in engagement with the electrical panel.

23 Claims, 6 Drawing Sheets

FIG. 7
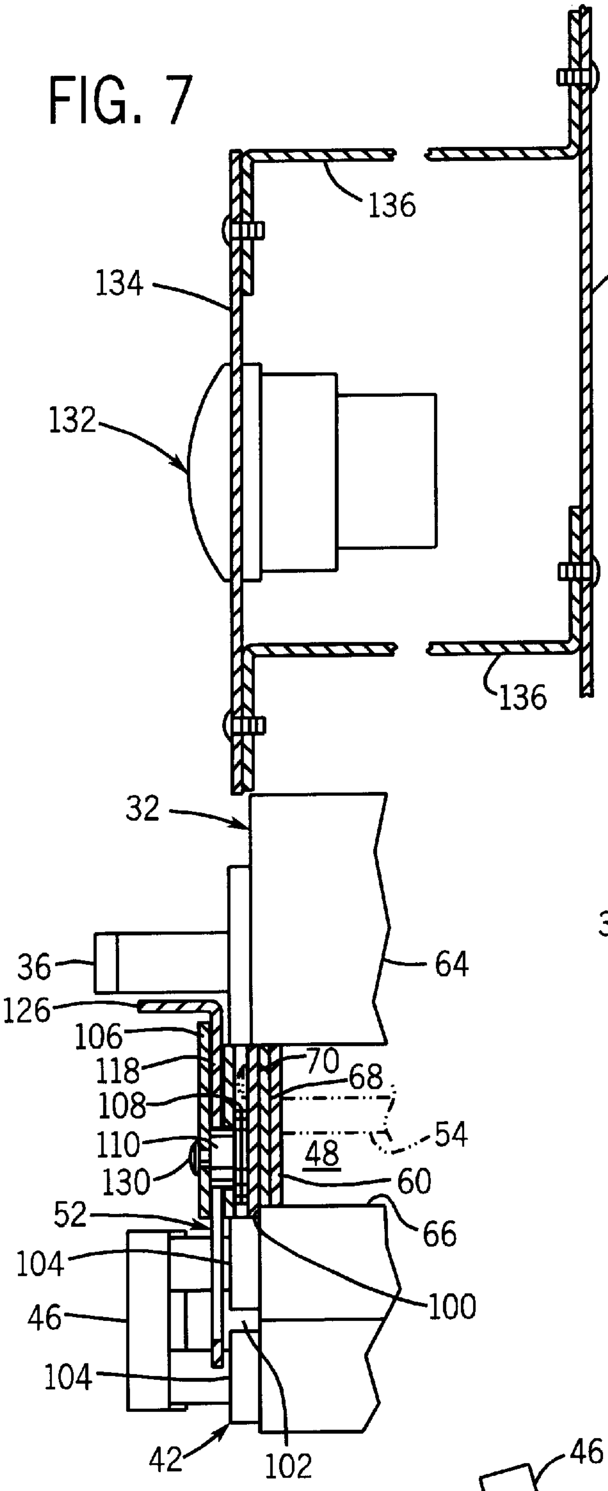
FIG. 8
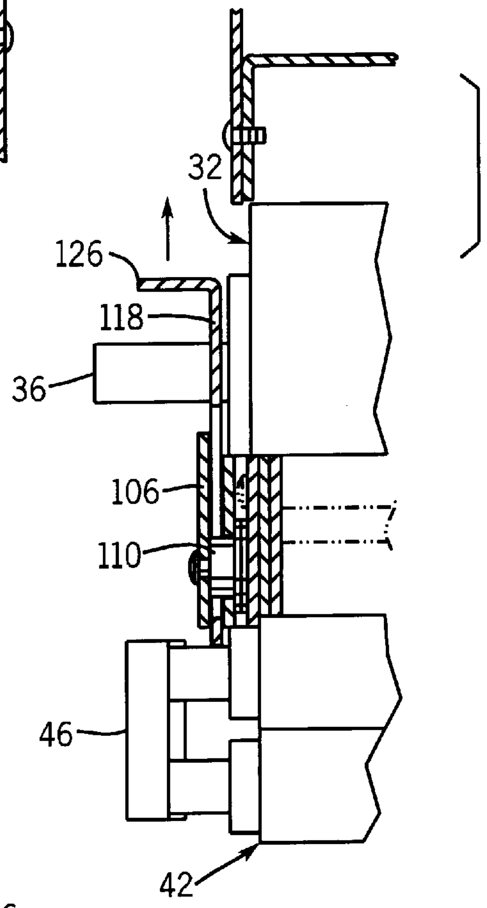
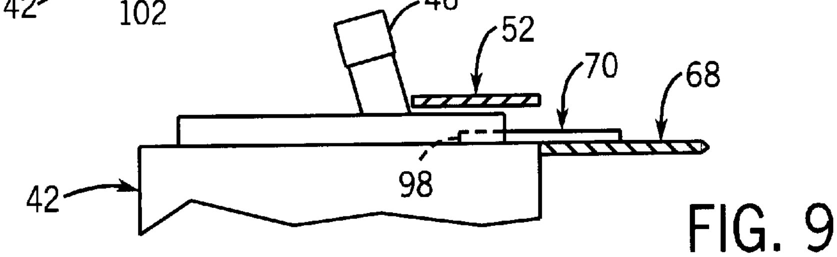
FIG. 9

INTERLOCK ARRANGEMENT FOR AN ELECTRICAL PANEL HAVING PARALLEL CENTER-MOUNTED AND AUXILIARY MAIN BREAKERS

BACKGROUND AND SUMMARY OF THE INVENTION

This invention relates to an electrical load center or panel, and more particularly to such a panel which is adapted to be supplied with power from a primary power source and which also includes a power input from an auxiliary power source so as to supply power to the panel in the event of an outage or interruption in the supply of power from the primary power source.

An electrical load center or panel typically includes a main switch, in the form of a circuit breaker, that is interconnected with a primary power source such as utility power. The main switch or breaker is operable to control the supply of power to the electrical panel from the utility. In some electrical panels, the main breaker is center-mounted and includes a main breaker switch member or handle that is movable between an ON position and an OFF position. The panel also includes a series of connection areas which are adapted to mount a series of branch circuit breakers for distributing power from the electrical panel to the various loads within the building. The connection areas are oriented such that the switches of the branch circuit breakers are movable between ON and OFF positions in a direction parallel to the direction of movement of the main breaker switch member between its ON and OFF positions.

In order to ensure a constant supply of power to the loads interconnected with the branch circuit breakers, it is known to mount an auxiliary main breaker to certain of the connection areas of the electrical panel, and to interconnect the auxiliary main breaker with an auxiliary power supply such as a standby generator or the like. The auxiliary main breaker is typically mounted to the electrical panel adjacent the primary main breaker, and includes a switch member movable between ON and OFF positions in a direction parallel to that of the switch member of the primary main breaker, to control the supply of power to the electrical panel from the auxiliary power source. In this type of arrangement, it is important to ensure that the switch members of the primary and auxiliary main breakers cannot both be in the ON position at the same time, to prevent power from being simultaneously supplied to the electrical panel from both the primary and the auxiliary power sources. Various interlock arrangements have been developed to address this problem, and examples are illustrated in Flegel U.S. Pat. Nos. 5,761,027; 6,031,193; and 6,184,595, the disclosures of which are hereby incorporated by reference.

It is an object of the present invention to provide an interlock for a dual power source electrical panel which is effective to prevent the switch members of both the primary and auxiliary main breakers from being in the ON position at the same time, to ensure that the electrical panel is supplied with power from only a single power source at any one time. It is a further object of the invention to provide such an interlock which is adapted for use in an electrical panel in which the switch members of the primary and auxiliary main breakers are spaced apart from each other and are movable in parallel directions between their ON and OFF positions. It is a further object of the invention to provide such an interlock which can be relatively quickly and easily mounted to the electrical panel in the vicinity of both the primary and auxiliary main breakers. Yet another object of the invention is to provide such an interlock which is configured so as to prevent removal of the auxiliary main breaker from the panel, while enabling removal of the primary main breaker from the panel. A still further object of the invention is to provide such an interlock which can be configured so as not to interfere with the connection areas of the electrical panel so as to maximize the number of branch circuit breakers or other devices that can be mounted to the electrical panel. A still further object of the invention is to provide such an interlock which is intuitive in operation so as to provide ease of use by a user. Yet another object of the invention is to provide such an interlock which is relatively simple in its components and construction, yet which is capable of providing relatively quick and easy connection to the panel and a reliable and effective interlock mechanism for ensuring that the branch circuit breakers are not simultaneously supplied with power from two different power sources.

In accordance with the present invention, an electrical panel includes a first or primary switch, in the form of a circuit breaker having a movable switch member, that is interconnected with a primary source of power such as utility power. The electrical panel further includes a second or auxiliary switch, in the form of an auxiliary main breaker having a movable switch member, that is interconnected with a secondary power source such as a standby generator. The auxiliary breaker is mounted to the panel adjacent the primary breaker, such that a space is located between the auxiliary breaker and the main breaker. An interlock is interconnected with the electrical panel within the space between the primary and auxiliary breakers, and is operable to ensure that the switch member of the primary breaker cannot be moved to its ON position when the auxiliary breaker switch member is in its ON position, and vice versa, to prevent the panel from being supplied with power from both the primary and auxiliary power sources at the same time.

The interlock includes a support arrangement connected to the electrical panel, and an interlock member that is movably mounted to the support arrangement for movement between first and second interlock positions. In its first interlock position, the interlock member is positioned in line with the auxiliary breaker switch member in its OFF position, so as to prevent movement to its ON position, and is positioned relative to the primary breaker switch member so as to enable movement between its ON and OFF positions. In its second interlock position, the interlock member is positioned in line with the primary breaker switch member in its OFF position, so as to prevent movement to its ON position, and is positioned relative to the auxiliary breaker switch member so as to enable movement between its ON and OFF positions.

In one form, the auxiliary breaker is located vertically below the primary breaker, and the interlock member is configured so as to rest on the auxiliary breaker switch member in its ON position, to maintain the interlock member in its second interlock position. In this manner, when the auxiliary breaker switch member is moved from its ON position to its OFF position, support for the interlock member is removed and the interlock member is moved from its second interlock position to its first interlock position. In the event the electrical panel is mounted in a vertical orientation with the auxiliary breaker below the primary breaker, the interlock member is biased by gravity toward its first interlock position so as to move toward its first interlock position when the auxiliary switch member is moved to its OFF position. This prevents subsequent return of the auxiliary breaker switch member to its ON position until the primary breaker switch member is moved to its OFF position, which allows the interlock member to be placed in its second interlock position from its first interlock position. The electrical panel may also be in a vertical orientation with the primary breaker below the auxiliary breaker, such that the interlock member is subjected to a gravity bias toward its second interlock position.

The interlock support arrangement includes a support post connected to and extending from the electrical panel, and a support base secured to the support post. The interlock member is slidably interconnected with the support base for movement between its first and second interlock positions. The support base may include a pair of spaced apart slide members between which the interlock member is received. Movement of the interlock member between its first and second interlock positions may be controlled by means of a guide surface associated with the support base which engages a guide edge defined by the interlock member, in combination with a slot formed in the interlock member which receives a stud associated with the support base for controlling movement of the interlock member. Engagement of the stud with the ends of the slot is operable to define the range of motion of the interlock member between its first and second interlock positions.

The support base is preferably configured so as to engage the auxiliary breaker and maintain the auxiliary breaker in engagement with the electrical panel. The support arrangement is further configured so as not to interfere with the primary breaker when the primary breaker is engaged with the electrical panel, so as to enable removal of the primary breaker from the electrical panel if desired. The auxiliary breaker preferably includes an outwardly facing surface, and the support arrangement is configured so as to overlie a portion of the outwardly facing surface to prevent removal of the auxiliary breaker. The support arrangement further includes an edge located adjacent a side surface of the primary breaker. The support arrangement does not overlap any outwardly facing surfaces of the primary breaker, so that the primary breaker can be moved outwardly for removal from the electrical panel.

The electrical panel may further include a power meter arrangement for measuring power supplied to either or both of the primary and auxiliary breakers. The power meter arrangement may be in the form of a meter mounting bracket secured to a back wall defined by a housing associated with the electrical panel, and one or more power meters mounted to the meter mounting bracket. The meter mounting bracket is preferably located on an opposite side of the main breaker from the interlock, and the meter mounting bracket is configured so as to define an edge located adjacent an opposite side surface of the primary breaker, such that the meter mounting bracket also does not interfere with outward movement of the primary breaker relative to the panel, if desired.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 7 is a section view taken along line 7—7 of FIG. 2;

FIG. 8 is a section view taken along line 8—8 of FIG. 4;

FIG. 9 is a partial section view taken along line 9—9 of FIG. 2;

DETAILED DESCRIPTION OF THE INVENTION

Figure 1:
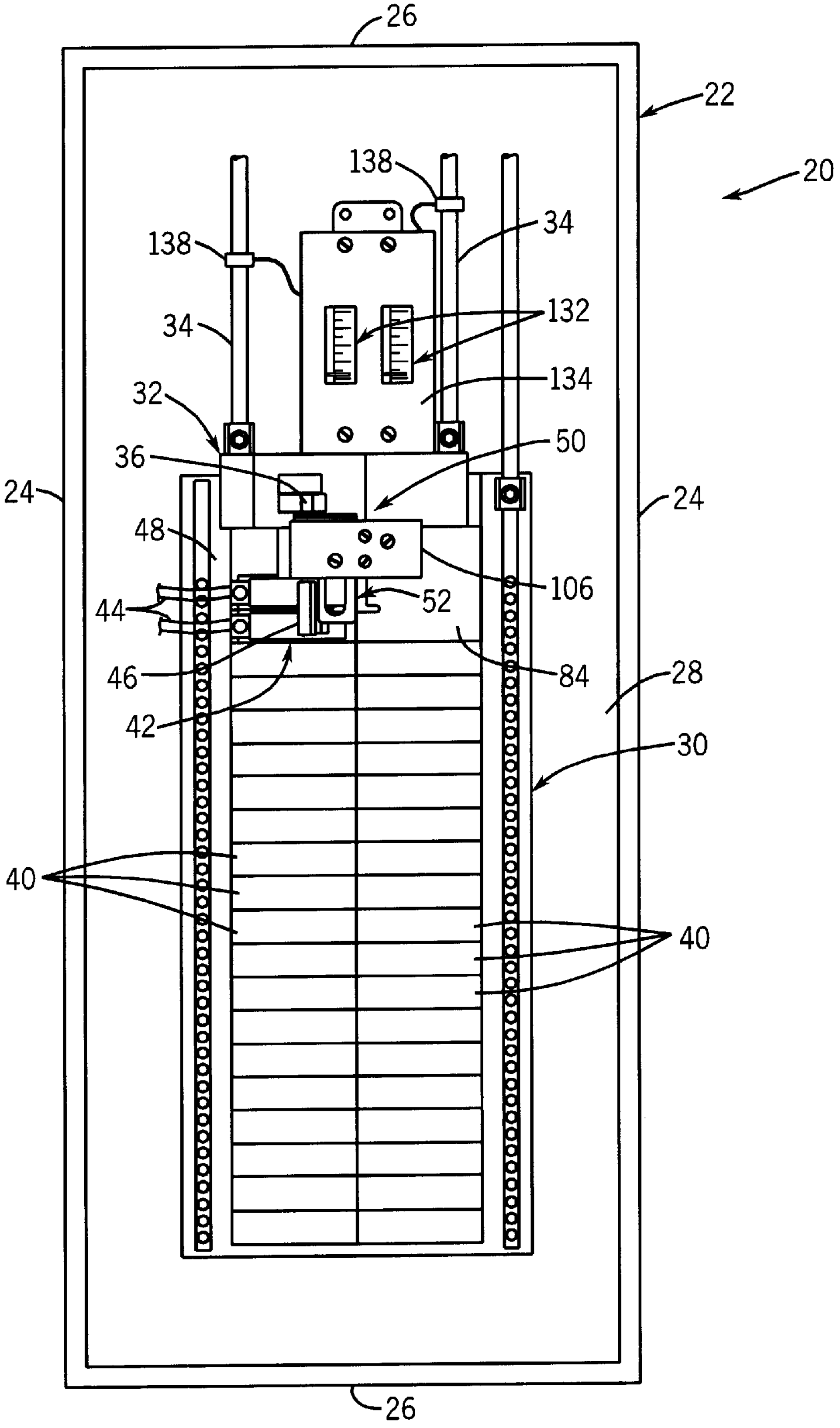
FIG. 1 is a front elevation view of an electrical panel incorporating primary and auxiliary main breakers for controlling the supply of primary and auxiliary power to the panel, and the interlock in accordance with the present invention for preventing both the primary and auxiliary main breakers from being in the ON position at the same time, showing the interlock member in its first interlock position.

Referring to FIG. 1, an electrical load center or power input panel 20 generally includes a housing 22 having side walls 24 and end walls 26 that extend outwardly from a back wall 28, which cooperate to define an open interior within which a power distribution base assembly 30 is mounted, preferably by securement to back wall 28. A cover or door is engageable with housing 22 for covering the internal components of electrical panel 20. This general construction of electrical panel 20 is in accordance with conventional construction, and is available from a number of known sources.

Also as is known, electrical panel 20 includes a center-mounted main switch assembly, in the form of a primary main breaker 32, secured to the top of base assembly 30. Primary power input wires or cables 34 are secured to the connection areas of primary main breaker 32, for providing input power to electrical panel 20 from a primary power source, such as an electric utility. Primary main breaker 32 includes a primary switch member 36, which is movable between ON and OFF positions. When primary switch member 36 is in its ON position, primary main breaker 32 is operable to supply power to base assembly 30 from the primary power source. When primary switch member 36 is in its OFF position, primary main breaker 32 functions to cut off the supply of power from the primary power source to base assembly 30.

In accordance with conventional construction, base assembly 30 includes a series of branch circuit breaker slots or mounting areas 40, which are adapted to receive circuit breakers interconnected in individual branch circuits.

An auxiliary main breaker 42 is mounted to the topmost pair of branch breaker mounting areas 40. Auxiliary main breaker 42 is interconnected with an auxiliary power source, such as a standby generator, via a pair of wires or cables 44. Auxiliary main breaker 42 includes an auxiliary switch member 46, which is movable between an ON position for providing auxiliary power to base assembly 30, and an OFF position for cutting off the supply of auxiliary power to base assembly 30. Auxiliary main breaker 42 is spaced below primary main breaker 32, such that a space 48 is defined therebetween. Primary switch member 36 and auxiliary switch member 46 are offset from each other, and are movable in parallel directions between their ON and OFF positions.

An interlock assembly 50 is mounted to base 28 between primary main breaker 32 and auxiliary main breaker 42, for ensuring that primary switch member 36 and auxiliary switch member 46 cannot be simultaneously placed in their ON positions. In this manner, interlock assembly 50 functions to prevent the simultaneous supply of power to base assembly 30 from both the primary and auxiliary power sources.

Figure 2:
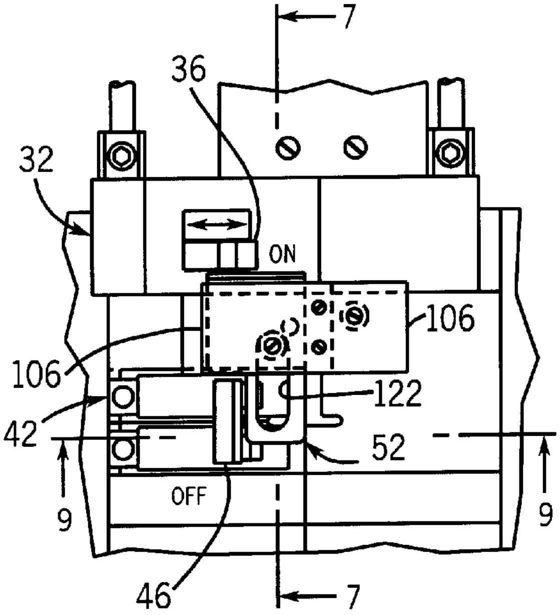
FIG. 2 is a partial front elevation view showing the primary and auxiliary main breakers and the interlock of the electrical panel of FIG. 1, again showing the interlock member in its first interlock position; and the switch member of the primary main breaker in its ON position.
Figure 3:
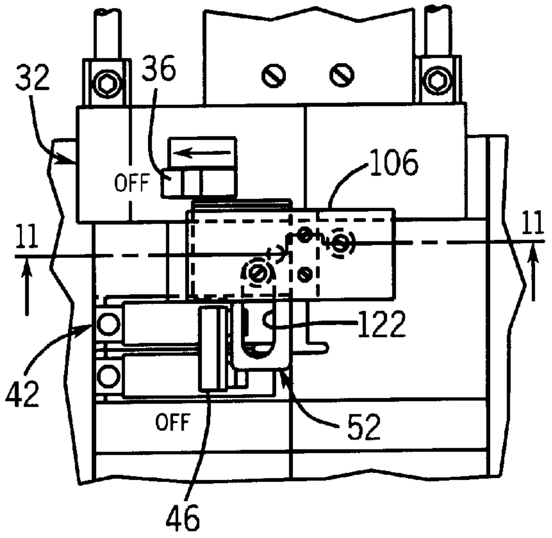
FIG. 3 is a view similar to FIG. 2, showing movement of the primary breaker switch member to its OFF position.
Figure 4:
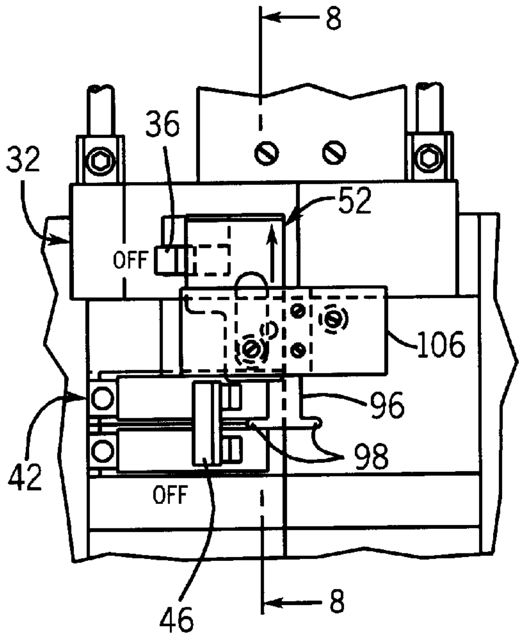
FIG. 4 is a view similar to FIGS. 2 and 3, showing movement of the interlock member to its second interlock position and showing the switch member of the auxiliary main breaker in its OFF position.
Figure 5:
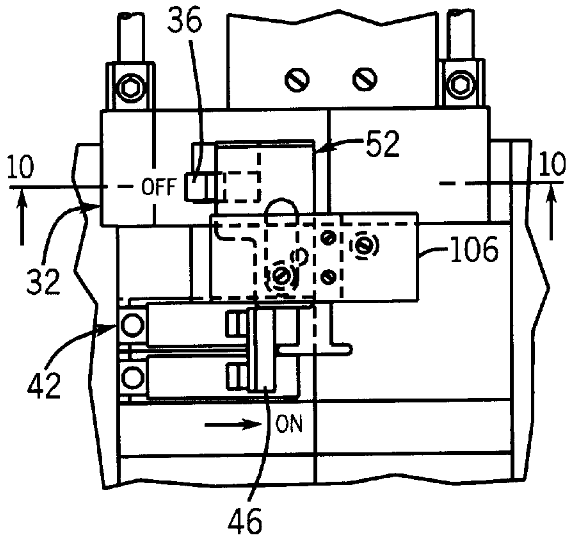
FIG. 5 is a view similar to FIG. 4, showing movement of the auxiliary breaker switch member to its ON position.

As shown in FIGS. 2, 3, 6 and 7, interlock assembly 50 generally includes a support arrangement secured to housing back wall 28 and extending outwardly from base assembly 30, which serves to movably support an interlock member 52. Interlock member 52 is movable to a first interlock position as shown in FIGS. 2 and 3, in which interlock member 52 is positioned to allow primary switch member 36 to be moved between its ON and OFF positions, while preventing movement of auxiliary switch member 46 to its ON position. Interlock member 52 is also movable to a second interlock position, as shown in FIGS. 4 and 5, in which interlock member. 52 is positioned so as to prevent movement of primary switch member 36 to its ON position, while enabling movement of auxiliary switch member 46 between its ON and OFF positions.

Figure 6:
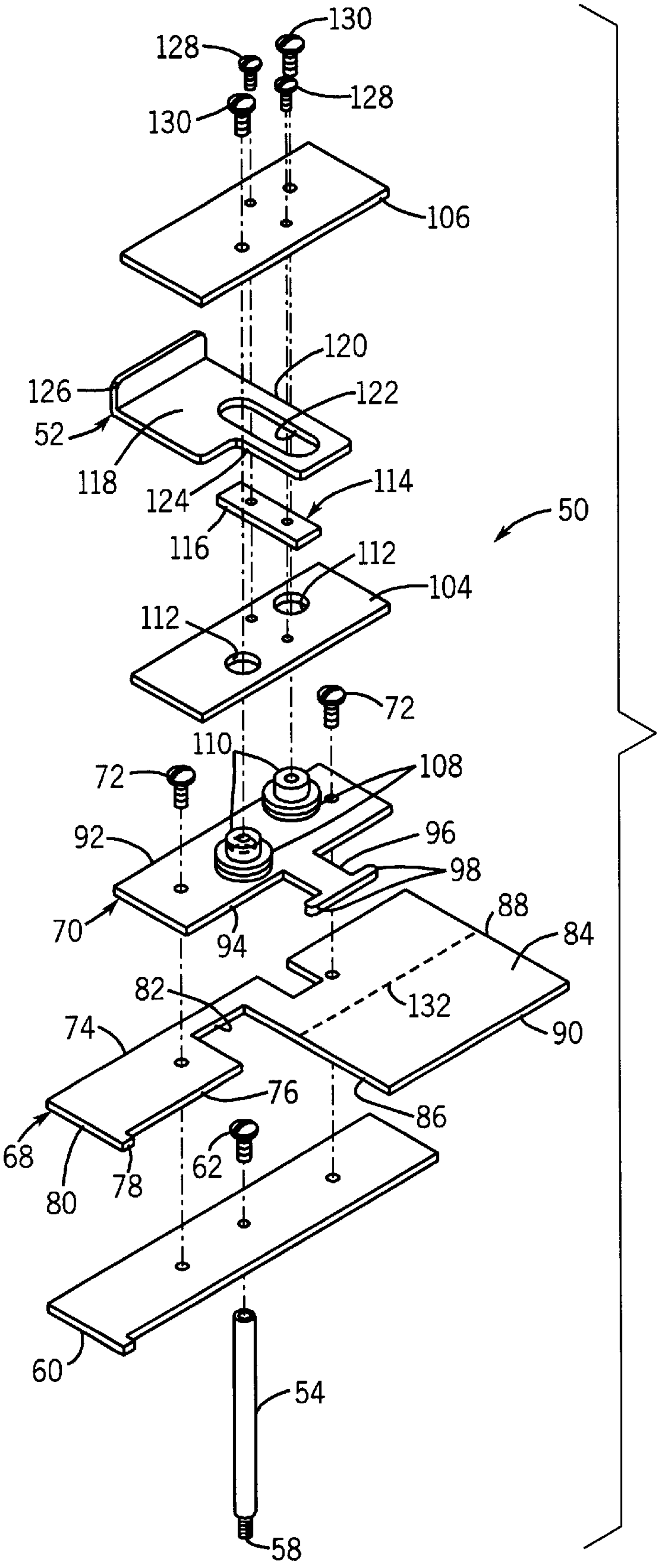
FIG. 6 is an exploded isometric view showing the components incorporated into the interlock illustrated in FIGS. 1–5.
Figure 10:
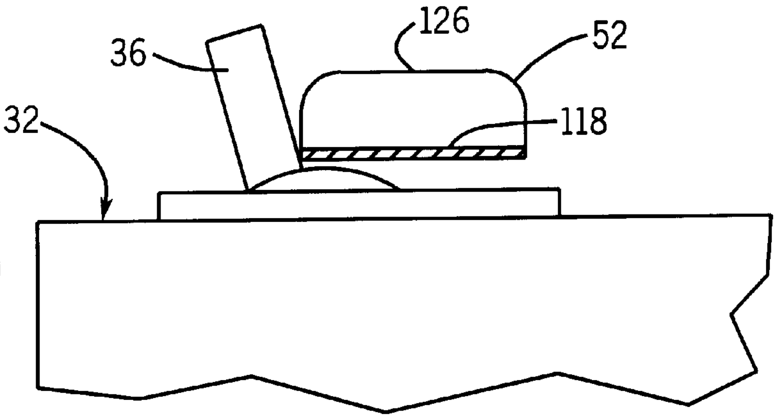
FIG. 10 is a partial section view taken along line 10—10 of FIG. 5.
Figure 11:
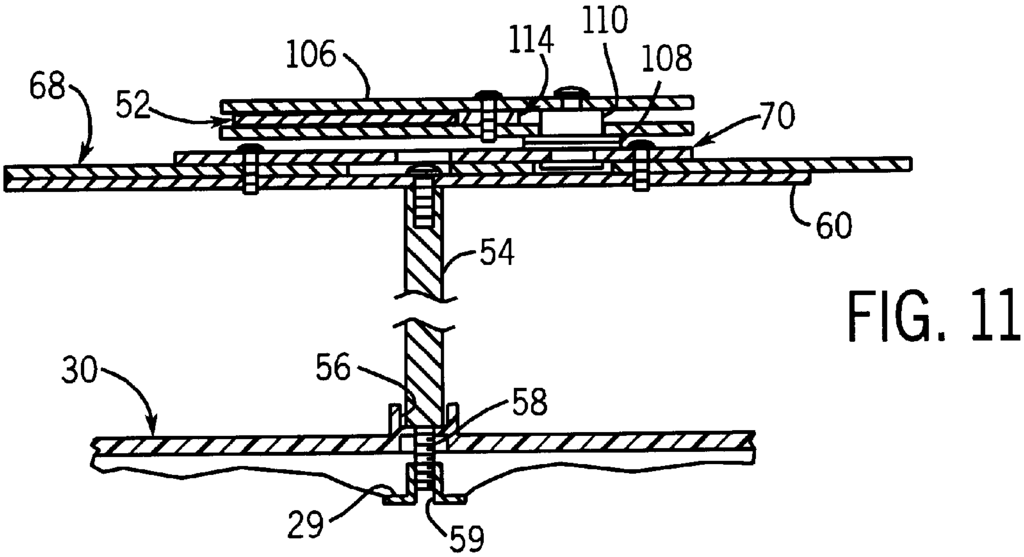
FIG. 11 is a partial section view taken along line 11—11 of FIG. 3.

Referring to FIGS. 6, 7 and 11, the support arrangement of interlock assembly 50 includes a support post 54 having a lower end received within a recess 56 defined by base assembly 30. A threaded connector 58 extends outwardly from the lower end of support post 54. Threaded connector 58 extends through an opening in base assembly 50 and is received within a threaded passage 59 formed in housing back wall 28. Support post 54 and its associated threaded connector 58 engage base assembly 30 with housing back wall 28, and are employed in place of a threaded connector having a head engaged within recess 56 and a threaded shank that extends through base assembly 30 and into engagement with passage 59. In this manner, interlock assembly 30 can be retrofitted to electrical panel 20 without the need to adapt any of the components or construction of base assembly 30 or primary and auxiliary main breakers 32 and 42.

A transverse base plate 60 is secured to the upper end of support post 54 via a threaded connector 62, which extends through an opening in base plate 60 and into a threaded passage extending inwardly into the upper end of support post 54. Base plate 60 is configured so as to correspond in shape to space 48, which is defined between primary main breaker 32 and auxiliary main breaker 42 by spaced apart facing side surfaces, shown at 64, 66, respectively, such that the edges of base plate 60 are located in close proximity to side surfaces 64, 66.

A spacer plate 68 and a retainer plate 70 are secured to base plate 60 via a pair of threaded connectors 72 that extend through aligned openings in spacer plate 68 and retainer plate 70 into engagement with aligned threaded openings in base plate 60.

Spacer plate 68 defines a top edge 74 which is adapted for placement against side surface 64 of primary main breaker 32. At its leftward side, spacer plate 68 includes a bottom edge 76 adapted for placement against side surface 66 of auxiliary main breaker 42. A tab 78 extends downwardly from the leftward side of spacer plate 68 and base plate 60, and wraps about the outer face of auxiliary main breaker 42. Spacer plate 68 further includes an end edge 80 which is adapted to be placed into alignment with the outer end of auxiliary main breaker 42.

Spacer plate 68 further includes a recess 82 which receives the head of connector 62, and a rightward blocking section 84 defined by top edge 74 in combination with an inner end edge 86, an outer end edge 88 and a bottom edge 90. Inner end edge 86 is located so as to be in close proximity to the inner end surface of primary breaker 32, and bottom surface 90 is in alignment with the lower side edge defined by auxiliary main breaker 42. Outer end edge 88 is located in line with the outer extent of the rightward set of branch breaker mounting areas 40 defined by base assembly 30. Blocking section 84 is configured so as to overlie the upper rightward pair of mounting areas 40 opposite auxiliary main breaker 42, so as to prevent engagement of branch circuit breakers therewith.

Retainer plate 70 defines a top edge 92 located in close proximity to side surface 64 of primary main breaker 32. At its lower end, retainer plate 70 defines a bottom edge 94 and a retainer foot 96 having a pair of retainer tabs 98 that extend in opposite directions from the lower end of retainer foot 96. In assembly, retainer plate 70 is configured such that its lower area adjacent bottom edge 94 engages an upper shoulder 100 defined by auxiliary main breaker 42. The leftward edge area defined by foot 96 overlies a similar shoulder formed at the inner end of auxiliary main breaker 42, and the leftward one of retainer tabs 98 is received within a space 102 formed between a pair of switch member mounting sections 104 defined by the pair of breakers which together make up auxiliary main breaker 42. In this manner, retainer plate 70 functions to maintain auxiliary main breaker 42 in engagement with base assembly 30 of electrical panel 20 by preventing outward movement of auxiliary main breaker 42 away from base assembly 30. In addition, base plate 60, spacer plate 68 and retainer plate 70 are configured so as not to overlie any of the outwardly facing surfaces defined by primary main breaker 32, so as to enable primary main breaker 32 to be moved outwardly for disengagement from base assembly 30.

Interlock member 52 is located between a pair of support members, in the form of an inner slide plate 104 and an outer side plate 106, which are mounted to a pair of spacers 108, each of which includes a mounting stud 110 extending outwardly from its upper surface. Inner slide plate 104 includes a pair of openings 112 which receive mounting studs 110. A guide member 114, which includes a linear guide edge 116, is located between inner and outer side plates 104, 106.

Interlock member 52 includes a main body section 118 defining a linear guide edge 120. A vertical slot 122 is formed in main body section 118, and a notch 124 is formed at the lower leftward area of main body section 118. At its upper end, interlock member 52 includes an outwardly extending flange 126 that extends from the upper end of main body section 118.

In assembly, inner and outer side plates 104, 106 are secured together via a pair of threaded connectors or rivets 128 that extend through aligned openings in outer slide plate 106 and guide member 114 into engagement with threaded or non-threaded openings in inner slide plate 104. Slot 122 in interlock member 52 is positioned in alignment with the leftward one of openings 112 in inner slide plate 104, and stud 110 extending upwardly from the leftward one of spacers 108 is received within the leftward one of openings 112 and within slot 122. The upper ends of studs 112 engage the inner surface of outer slide plate 106, which is secured to studs 110 via threaded connectors 130 that extend into engagement with threaded passages extending inwardly from the outer end of each stud 110. With this construction, interlock member 52 is slidably retained between inner and outer slide plates 104, 106 for movement between its first and second interlock positions. The leftward one of studs 110 is engaged within slot 122, which functions to retain interlock member 52 in engagement between inner and outer slide plates 104, 106 and to enable sliding movement of interlock member 52 along the longitudinal axis of slot 122. Guide edge 120 of interlock member main body section 118 is located in close proximity to guide edge 116 of guide member 114, so as to maintain the upright orientation of interlock member 52 during movement between its first and second interlock positions. Engagement of stud 110 with the ends of slot 122 functions to define the range of movement of interlock member 52 between its first and second interlock positions. Flange 126 is configured to extend outwardly beyond the outer surface of outer slide plate 106, and is adapted to be manually engaged by a user for enabling movement of interlock member 52.

In operation, interlock member 52 is normally in its first interlock position as shown in FIGS. 2 and 3, in which interlock member 52 maintains auxiliary switch member 46 in its OFF position. Primary switch member 36 is normally in its ON position. This enables a primary power source, such as a utility power supply, to supply power to base assembly 30 through primary main breaker 32. In the event of an interruption in the primary power supply, a standby generator or other auxiliary power supply is activated so as to supply power to auxiliary main breaker 42. To provide such power to base assembly 30 of electrical panel 20, the user first moves primary switch member 36 to its OFF position, as shown in FIG. 3, and then manually engages flange 126 of interlock member 52 so as to slide interlock member 52 upwardly to its second interlock position, as shown in FIG. 4. Such movement of interlock member 52 moves the lower end portion of interlock member 52 out of alignment with auxiliary switch member 46 and moves the upper portion of interlock member 52 into alignment with primary switch member 36. Auxiliary switch member 46 can then be moved from its OFF position of FIG. 4 to its ON position of FIG. 5, to supply auxiliary power to base assembly 30 through auxiliary main breaker 42. The user then disengages flange 126 of interlock member 52, and auxiliary switch member 46 is in the path of movement of interlock member 52, which functions to maintain interlock member 52 in its second interlock position.

In the event electrical panel 20 is oriented such that primary main breaker 32 is located above auxiliary main breaker 42, interlock member 52 is biased by gravity toward its first interlock position, which maintains the lower edge of interlock member 52 in engagement with the upper surface of auxiliary switch member 46 when interlock member 52 is in its second interlock position. When the primary power supply is restored, the user returns auxiliary switch member 46 to its OFF position of FIG. 2, which cuts off the supply of auxiliary power to base assembly 30 and moves auxiliary switch member 46 out of alignment with the lower end of interlock member 52. The gravity bias of interlock member 52 thus returns interlock member 52 to its first interlock position of FIG. 2, so as to enable primary switch member 36 to be moved to its ON position in order to restore the supply of power to base assembly 30 from the primary power source. Again, as noted previously, the lower end of interlock member 52 is in alignment with auxiliary switch member 46, to prevent movement of auxiliary switch member 46 to its ON position. Interlock member 52 cannot be moved from its first interlock position to its second interlock position until primary switch member 36 is moved from its ON position to its OFF position, which ensures that auxiliary switch member 46 cannot be moved to its ON position as long as primary switch member 36 remains in its ON-position. It is also understood that electrical panel 20 may be positioned such that auxiliary main breaker 42 is positioned above primary main breaker 32, such that interlock member 52 is subjected to a gravity bias toward its second interlock position. Electrical panel 20 may also be positioned such that there is little or no gravity bias on interlock member 52, which simply requires that the user manually move interlock member 52 between its first and second interlock positions.

In order to enable removal of primary main breaker 32 from base assembly 30, the user removes the connectors, typically in the form of a pair of nuts (not shown), that are used to secure primary main breaker 32 to base assembly 30. The user then slides primary main breaker 32 slightly relative to base assembly 30, and lifts primary main breaker 32 upwardly out of engagement with base assembly 30. This can be accomplished without disassembly of any of the components of interlock assembly 50, to provide relatively quick and easy disengagement of primary main breaker 32 if desired.

Figure 12:
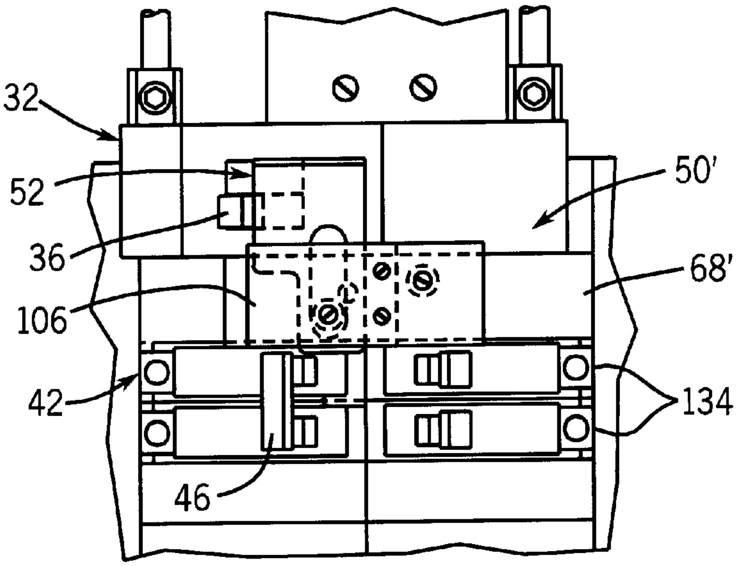
FIG. 12 is a view similar to FIG. 4, showing an alternative embodiment of the support base incorporated into the interlock.
Figure 13:
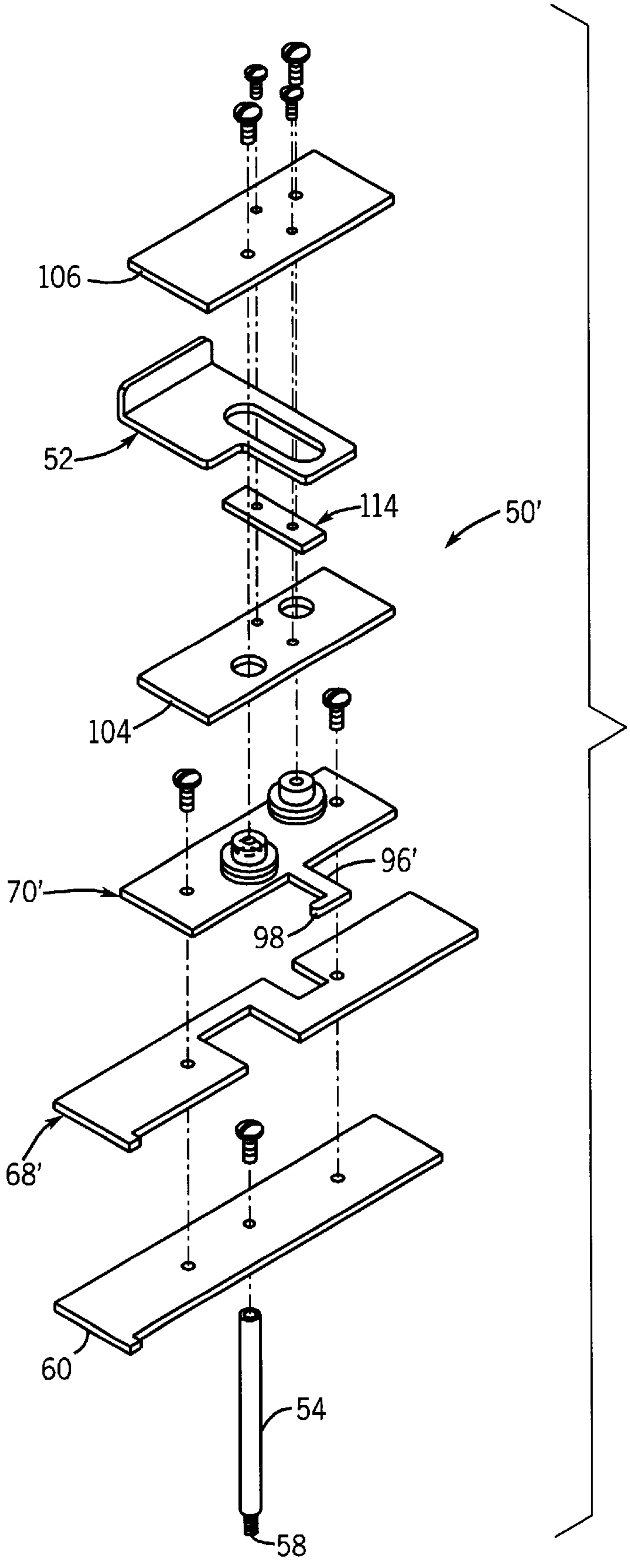
FIG. 13 is an exploded isometric view illustrating the components incorporated into the interlock of FIG. 12.

FIGS. 12 and 13 illustrate an alternative interlock assembly, shown at 50', and like reference characters will be used where possible to facilitate clarity. The components of interlock assembly 50' are generally similar to those of interlock assembly 50, with the exception of spacer plate 68 and retainer plate 70. In this embodiment, a spacer plate 68' is employed in place of spacer plate 68, and is configured such that blocking section 84 of spacer plate 68 is eliminated. This can be accomplished either by providing spacer plate 68 with perforations, shown at 132 (FIG. 6), which can be employed by a user to remove blocking section 84, or by providing a differently configured spacer plate having a construction as shown at 68'. In this embodiment, retainer plate 70' has a similar configuration to retainer plate 70 as shown and described previously, with the exception of foot 96' which includes a single tab 98. In this construction, none of the components of interlock assembly 50' overlie or interfere with branch circuit breaker mounting areas 40 opposite auxiliary main breaker 42, which enables branch breakers such as 134, or other accessories or devices, to be engaged with such mounting areas.

In either embodiment, electrical panel 20 may be provided with a power input measuring and indicator arrangement, in the form of one or more power input meters 132 secured to a meter plate 134 located above primary main breaker 32 within the interior of electrical panel housing 22. Meter mounting plate 134 is secured to a pair of meter mounting brackets 136, which in turn are connected to back wall 28 of electrical panel housing 22. The lower end edge of meter mounting plate 134 is located in close proximity to the upper surface of primary main breaker 32, and is configured so as not to interfere with outward movement of primary main breaker 32 in the event of disengagement of primary main breaker 32 from base assembly 30. Meters 132 provide 30 a visual indication of power supplied to electrical panel 20, such as by means of current transformers 138 through which power input wires or cables 34 extend. Current transformers such as 138 may also be provided for auxiliary power input wires or cables 44, to provide a visual indication of power supplied to electrical panel 20 from the auxiliary power source, if desired.

Various alternatives and embodiments are contemplated as being within the scope of the following claims particularly pointing out and distinctly claiming the subject matter regarded as the invention.

I claim:

1. An interlock for an electrical panel having first and second power sources interconnected with respective first and second switches, wherein the first and second switches have respective first and second switch members movable in a substantially parallel relationship between an ON position and an OFF position, wherein the first and second switches are located adjacent each other on the panel and wherein a space is defined between the first and second switches, the interlock comprising:

a support arrangement secured to the electrical panel within the space between the first and second switches, wherein the support arrangement includes a pair of spaced apart substantially planar support members wherein the support arrangement is configured so as to overlie an outwardly facing surface defined by the second switch so as to prevent removal of the second switch from the electrical panel; and an interlock member movably mounted to the support arrangement within the space between the planar support members, wherein the interlock member is movable between a first interlock position in which the interlock member enables movement of the first switch member between its ON and OFF positions while preventing movement of the second switch member to its ON position, and a second interlock position in which the interlock member enables movement of the second switch member between its ON and OFF positions while preventing movement of the first switch member to its ON position.

2. The interlock of claim 1, wherein the support arrangement includes a support post interconnected with the electrical panel and operable to locate the support arrangement outwardly from a rear area of the electrical panel between the first and second switches.

3. An interlock for an electrical panel having first and second power sources interconnected with respective first and second switches, wherein the first and second switches have respective first and second switch members movable in a substantially parallel relationship between an ON position and an OFF position, wherein the first and second switches are located adjacent each other on the panel and wherein a space is defined between the first and second switches, the interlock comprising:

a support arrangement secured to the electrical panel within the space between the first and second switches, wherein the support arrangement includes a pair of spaced apart substantially planar support members and a support post interconnected with the electrical panel and operable to locate the support arrangement outwardly from a rear area of the electrical panel between the first and second switches; and an interlock member movably mounted to the support arrangement within the space between the planar support members, wherein the interlock member is movable between a first interlock position in which the interlock member enables movement of the first switch member between its ON and OFF positions while preventing movement of the second switch member to its ON position, and a second interlock position in which the interlock member enables movement of the second switch member between its ON and OFF positions while preventing movement of the first switch member to its ON position, wherein the first and second switches are removably engaged with the electrical panel, and wherein the support arrangement is adapted for interconnection with the electrical panel subsequent to engagement of the first and second switches with the electrical panel, wherein the support arrangement is configured to engage the second switch and retain the second switch in engagement with the electrical panel, and is configured so as to enable removal of the first switch from the electrical panel.

4. The interlock of claim 3, wherein the first and second switches each include a switch body having an outwardly facing surface and a side surface, wherein the side surfaces of the switch bodies of the first and second switches face each other and function to define the space within which the support arrangement is located.

5. The interlock of claim 4, wherein at least one of the pair of spaced apart support members overlies and engages an edge area of the outwardly facing surface of the switch body of the second switch so as to maintain the second switch in engagement with the electrical panel, and wherein the pair of support members are configured so as not to overlie an outwardly facing surface defined by the switch body of the first switch.

6. An interlock for an electrical panel having first and second power sources interconnected with respective first and second switches, wherein the first and second switches have respective first and second switch members movable in a substantially parallel relationship between an ON position and an OFF position, wherein the first and second switches are located adjacent each other on the panel and wherein a space is defined between the first and second switches, the interlock comprising:

a support arrangement secured to the electrical panel within the space between the first and second switches, wherein the support arrangement includes a pair of spaced apart substantially planar support members; and an interlock member movably mounted to the support arrangement within the space between the planar support members, wherein the interlock member is movable between a first interlock position in which the interlock member enables movement of the first switch member between its ON and OFF positions while preventing movement of the second switch member to its ON position, and a second interlock position in which the interlock member enables movement of the second switch member between its ON and OFF positions while preventing movement of the first switch member to its ON position, wherein the switches are oriented such that the first switch is located vertically above the second switch, and wherein the interlock member is subjected to a gravity bias that tends to move the interlock member toward its first interlock position, wherein the interlock member defines a lower end area that engages the second switch member when the second switch member is in its ON position, and further includes an upper portion located in line with the first switch member when the first switch member is in its OFF position, to prevent movement of the first switch member to its ON position when the second switch member is in its ON position.

7. The interlock of claim 6, wherein movement of the second switch member to its OFF position causes disengagement of the lower end of the interlock member with the second switch member to enable the interlock member to move to its first interlock position in response to the gravity bias on the interlock members so as to enable movement of the first switch member between its ON and OFF positions, wherein the lower portion of the interlock member is in alignment with the second switch member in its OFF position so as to prevent movement of the second switch member to its ON position.

8. An electrical panel, comprising:

a center mounted main breaker adapted for interconnection with a primary power source;

an auxiliary main breaker adapted for interconnection with an auxiliary power source, wherein the auxiliary main breaker is connected to the electrical panel adjacent to and spaced from the center mounted main breaker;

wherein the center mounted main breaker and the auxiliary main breaker include respective switch members movable in substantially parallel relationship between ON and OFF positions;

an interlock support arrangement secured to the electrical panel within the space between the center mounted main breaker and the auxiliary main breaker, wherein the interlock support arrangement is configured to engage the auxiliary main breaker and retain the auxiliary main breaker in engagement with the electrical panel, and to enable the center mounted main breaker to be removed from the electrical panel; and an interlock member movably mounted to the interlock support arrangement for movement between a first interlock position in which the interlock member enables movement of the switch member of the center mounted main breaker to be moved to its ON and OFF positions while preventing movement of the switch member of the auxiliary main breaker to its ON position, and a second interlock position in which the interlock member enables movement of the switch member of the auxiliary main breaker to be moved between its ON and OFF positions while preventing movement of the switch member of the center mounted main breaker to its ON position.

9. The electrical panel of claim 8, wherein the interlock support arrangement includes a support member configured to overlie an outwardly facing surface defined by the auxiliary main breaker so as to retain the auxiliary main breaker in engagement with the electrical panel.

10. The electrical panel of claim 9, wherein the interlock support arrangement is configured so as not to overlie an outwardly facing surface defined by the center mounted main breaker so as not to interfere with outward movement of the center mounted main breaker from the electrical panel.

11. The electrical panel of claim 9, wherein the interlock support arrangement further includes a support post mounted to the electrical panel and operable to space the support member to a position that enables the support member to overlie the outwardly facing surface of the auxiliary main breaker.

12. The electrical panel of claim 9, wherein the interlock support arrangement further includes a pair of spaced apart outer support members between which the interlock member is slidably mounted for movement between its first and second interlock positions.

13. The electrical panel of claim 12, wherein the interlock support arrangement includes a stud to which an outer one of the outer support members is mounted, and wherein the interlock member includes a slot within which the stud is received, wherein engagement of the stud within the slot is operable to enable movement of the interlock member between its first and second interlock positions.

14. The electrical panel of claim 13, further comprising a guide surface located adjacent an edge defined by the interlock member, wherein the guide surface is operable to guide the interlock member for substantially linear movement between its first and second interlock positions.

15. The electrical panel of claim 9, further comprising an electrical power meter arrangement located adjacent the center mounted main breaker.

16. The electrical panel of claim 15, wherein the meter arrangement includes a meter support arrangment engaged with and extending outwardly from a rear wall defined by a housing associated with the electrical panel.

17. The electrical panel of claim 16, wherein the meter support arrangement includes a meter mounting member having an edge located adjacent the center mounted main breaker, wherein the edge of the meter mounting member is arranged and configured so as to enable the center mounted main breaker to be removed from the electrical panel.

18. An interlock for an electrical panel having a primary power source and an auxiliary power source, wherein the primary power source is interconnected with a primary switch having a primary switch member movable between an ON position and an OFF position, and wherein the auxiliary power source is interconnected with an auxiliary switch having an auxiliary switch member movable between an ON position and an OFF position, wherein the primary switch and the auxiliary switch are located adjacent each other on the panel and wherein a space is defined between the primary and auxiliary switches, the interlock comprising:

a support arrangement secured to the electrical panel within the space between the primary and auxiliary switches;

a pair of spaced apart support plates interconnected with the support arrangement and located within the space between the first and second switches; and an interlock member movably mounted between the pair of support plates, wherein the interlock member is movable between a first interlock position in which the interlock member enables movement of the primary switch member between its ON and OFF positions while preventing movement of the auxiliary switch member to its ON position, and a second interlock position in which the interlock member enables movement of the auxiliary switch member between its ON and OFF positions while preventing movement of the primary switch member to its ON position, wherein the switches are oriented such that the primary switch is located vertically above the auxiliary switch, and wherein the interlock member is subjected to a gravity bias that tends to move the interlock member toward its first interlock position, wherein the interlock member defines a lower end area that engages the auxiliary switch member when the auxiliary switch member is in its ON position, and further includes an upper portion located in line with the primary switch member when the primary switch member is in its OFF position, to prevent movement of the primary switch member to its ON position when the auxiliary switch member is in its ON position.

19. An interlock for an electrical panel having a primary power source and an auxiliary power source, wherein the primary power source is interconnected with a primary switch having a primary switch member movable between an ON position and an OFF position, and wherein the auxiliary power source is interconnected with an auxiliary switch having an auxiliary switch member movable between an ON position and an OFF position, wherein the primary switch and the auxiliary switch are located adjacent each other on the panel and wherein a space is defined between the primary and auxiliary switches, the interlock comprising:

a support arrangement secured to the electrical panel within the space between the primary and auxiliary switches;

a pair of spaced apart support plates interconnected with the support arrangement and located within the space between the first and second switches; and an interlock member movably mounted between the pair of support plates, wherein the interlock member is movable between a first interlock position in which the interlock member enables movement of the primary switch member between its ON and OFF positions while preventing movement of the auxiliary switch member to its ON position, and a second interlock position in which the interlock member enables movement of the auxiliary switch member between its ON and OFF positions while preventing movement of the primary switch member to its ON position, wherein the support arrangement is configured so as to overlie an outwardly facing surface defined by the auxiliary switch so as to prevent removal of the auxiliary switch from the electrical panel.

20. The interlock of claim 19, wherein the interlock is configured so as not to interfere with outward movement of the primary switch relative to the electrical panel.

21. An interlock for an electrical panel having a primary power source and an auxiliary power source, wherein the primary power source is interconnected with a primary switch having a primary switch member movable between an ON position and an OFF position, and wherein the auxiliary power source is interconnected with an auxiliary switch having an auxiliary switch member movable between an ON position and an OFF position, wherein the primary switch and the auxiliary switch are located adjacent each other on the panel and wherein a space is defined between the primary and auxiliary switches, the interlock comprising:

a support arrangement secured to the electrical panel within the space between the primary and auxiliary switches;

a pair of spaced apart support plates interconnected with the support arrangement and located within the space between the first and second switches; and an interlock member movably mounted between the pair of support plates, wherein the interlock member is movable between a first interlock position in which the interlock member enables movement of the primary switch member between its ON and OFF positions while preventing movement of the auxiliary switch member to its ON position, and a second interlock position in which the interlock member enables movement of the auxiliary switch member between its ON and OFF positions while preventing movement of the primary switch member to its ON position, wherein the interlock member includes an upper portion and a lower portion, wherein a lower edge defined by the lower portion rests on the auxiliary switch member when the auxiliary switch member is in its ON position and wherein the upper portion of the interlock member is located in alignment with the primary switch member in its OFF position so as to prevent movement of the primary switch member to its ON position, and wherein movement of the auxiliary switch member to its OFF position enables the interlock member to be moved into alignment with the auxiliary switch member and to move the upper portion of the interlock member out of the path of the primary switch member, to prevent movement of the auxiliary switch member to its ON position while enabling movement of the primary switch member between its ON and OFF positions.

22. The interlock of claim 21, including a guide arrangement between the pair of support plates for guiding movement of the interlock member between its first and second interlock positions.

23. The interlock of claim 22, wherein the guide arrangement includes a stud disposed within the space between the support plates, wherein the interlock member includes a slot within which the stud is received, and a guide edge which cooperates with an edge surface defined by the interlock member for providing substantially linear movement of the interlock member between its first and second interlock positions, wherein engagement of the stud within the slot functions to limit the range of movement of the interlock member between its first and second interlock positions.

* * * * *